UNITED STATES PATENT OFFICE.

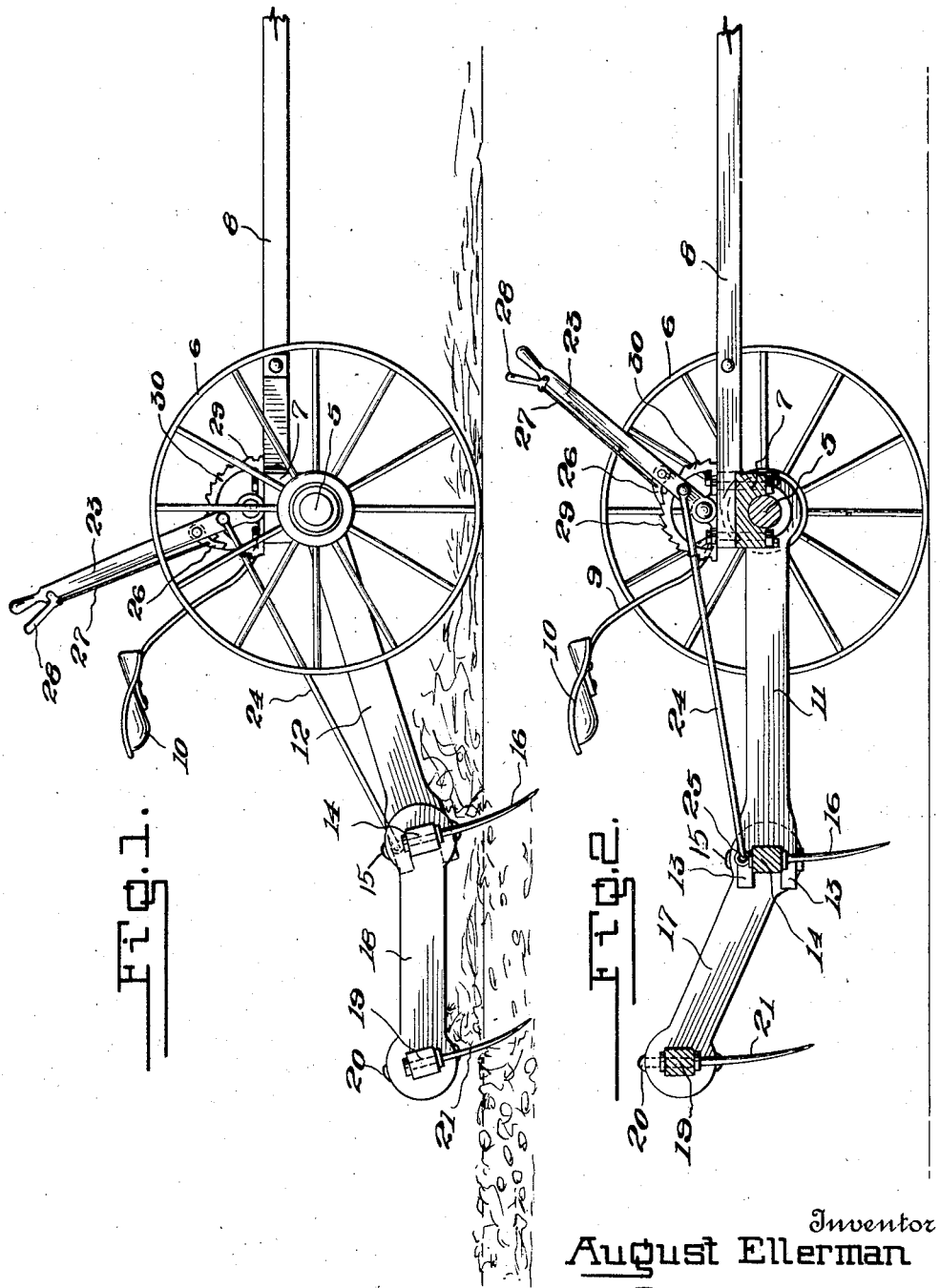

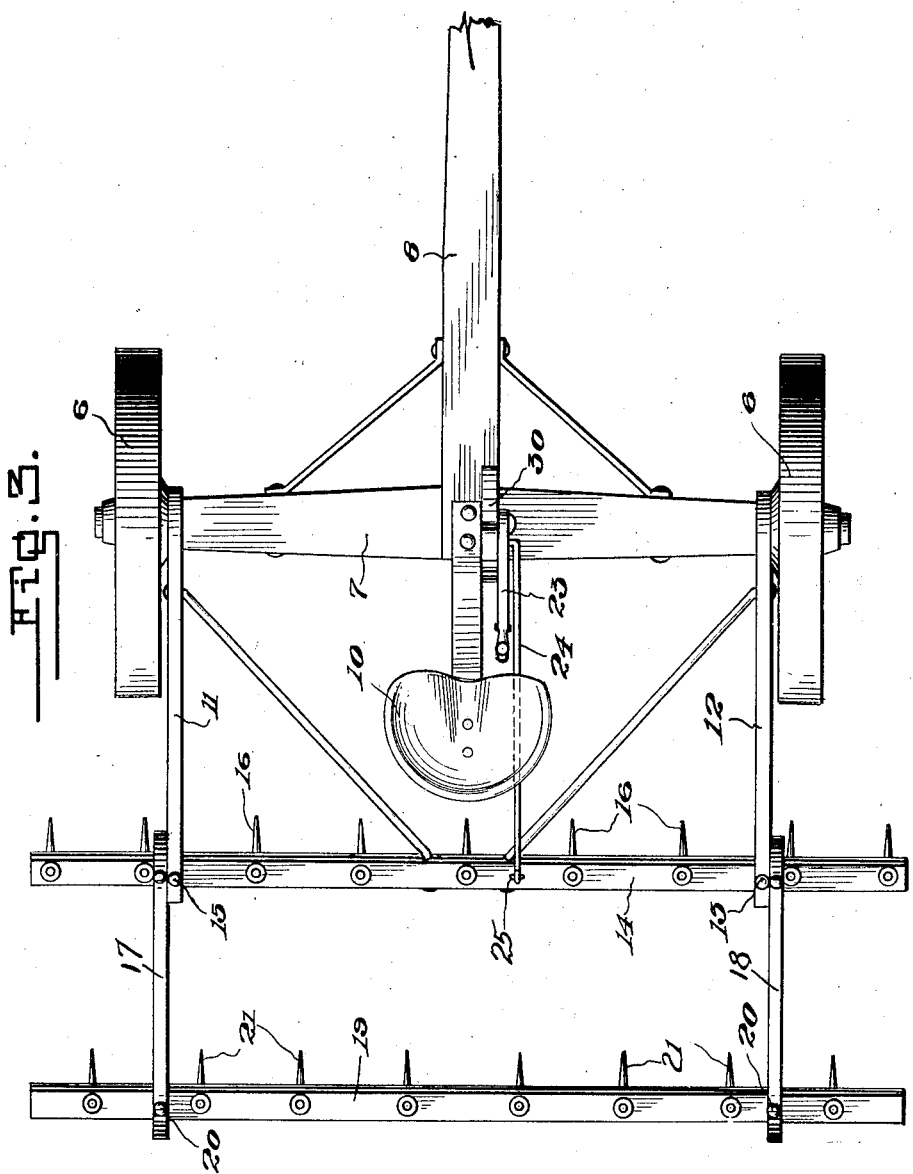

AUGUST ELLERMAN, OF MELLEN, WISCONSIN.

AGRICULTURAL IMPLEMENT.

1,333,477.

Specification of Letters Patent.

Patented Mar. 9, 1920.

Application filed June 2, 1919. Serial No. 301,233.

*To all whom it may concern:*

Be it known that I, AUGUST ELLERMAN, a citizen of the United States, residing at Mellen, in the county of Ashland and State of Wisconsin, have invented certain new and useful Improvements in Agricultural Implements, of which the following is a specification.

This invention relates to agricultural implements, and more particularly to a device designed principally for uprooting and destroying quack grass or other weed growths, and an object of the invention is to provide an implement for this purpose which is relatively light in weight and in which the uprooting elements may be adjusted, to regulate their depth of insertion into the ground.

A further object of this invention is to provide an implement including an axle having a pair of supports pivotally connected thereto, the rear ends of which supports are forked, and engage over and are connected to the tooth carrying beam, and also to provide other teeth carrying beams which are positioned rearwardly of the first tooth carrying beam and normally lie in a horizontal plane above the plane of the first tooth carrying bar, whereby the teeth carried by the rearmost bar may be utilized as a rake, while the teeth carried by the front bar are used for uprooting the quack grass or other analogous growths, if it be so desired.

Other objects of the invention will appear in the following detailed description taken in connection with the accompanying drawings, forming a part of this specification, and in which drawings:

Figure 1 is a side elevation of the improved implement.

Fig. 2 is a longitudinal section through the implement, and

Fig. 3 is a top plan of the implement.

Referring more particularly to the drawings, 5 indicates the axle of the implement which has traction supporting wheels 6 mounted upon its spindle ends, and upon which axle is mounted a housing or guard 7 forming means by which the tongue 8 is attached to the axle structure and also permitting the attachment of the standards 9 which support a seat 10 of the ordinary type employed in agricultural implements, to the axle structure.

A pair of rearwardly extending bars 11 and 12 are pivotally connected to the axle 5 adjacent the inner sides of the wheels 6. These bars 11 and 12 extend rearwardly, and have recesses formed in their rear ends providing spaced arms 13 which engage over the upper and lower sides of a tooth carrying beam 14. Pins 15 or analogous fastening devices are inserted through the forked ends of the arms 11 and 12 and through the beam 14 for connecting the beam to the arms.

The beam 14 carries a plurality of uprooting teeth 16 spaced at intervals longitudinally thereof. The teeth 16 may be of any desired shape but they preferably incline and curve slightly toward the axles 5 as they extend downwardly, to cause an uprooting action during the forward travel of the implement.

A pair of arms 17 and 18 are attached to the forward beam 14 and extend rearwardly from the beam and upwardly therefrom when the arms 11 and 12 are in horizontal plane as shown in Fig. 2 of the drawings, thereby positioning the rear ends of these arms 17 and 18 in a horizontal plane above the normal horizontal plane of the beams 14. A beam 19 is carried by the rear end of the arms 17 and 18 and is attached thereto by means of removable pins 20 permitting disconnection of the beam 19 with the arms 17 and 18 if desired.

A plurality of uprooting tongues or tines 21 are carried by the rear beam 19 and are preferably disposed in staggered relation with respect to the teeth or tines 18 carried by the front beam 14.

A hand lever 23 is pivotally connected to the tongue 8 or the supporting bar 7 as desired, and it has a rod 24 pivotally connected thereto which is connected as shown at 25 to the beam 14 intermediate the ends of this beam. A pawl 26 is pivotally carried by the lever 23 being operable through the medium of a rod 27 and hand grip 28 and is adapted to engage any one of the teeth 29 of the segmental ratchet 30 for holding the lever 23 and consequently the beams 14 and 19 in various adjusted positions.

When the quack grass or other foreign growth to be uprooted is rather deep in the ground and solid or of firm growth, the lever 23 is moved rearwardly so as to allow the tines or teeth 16 and 21 carried by the beams 14 and 19 to burrow into the ground for uprooting the quack grass. These teeth or tines also act as rake teeth above the surface of the ground for dragging the uprooted grass or weeds to any desired point and they may be dumped by means of the lever 23. In case the quack grass be comparatively light of growth, the lever 23 may be adjusted so that the tines 16 carried by the forward beam 14 will burrow into the ground for uprooting the quack grass or other weeds while the tines 21 move along the upper surface of the ground and act as rake means for raking the uprooted grass and other foreign growths into windrows for later gathering and destruction.

Changes in details may be made without departing from the spirit of this invention, but;

I claim:

1. In an agricultural implement, the combination of a supporting axle, a pair of arms pivotally connected to said axle, a beam carried at the rear ends of said arms, and a second beam supported rearwardly of said first-named beam and at a horizontal plane normally above the horizontal plane of the first beam.

2. In an agricultural implement, the combination of an axle, a pair of arms pivotally carried by said axle, a plurality of beams supported by said arms and rearwardly of their rear ends, said beams normally lying in vertically spaced horizontal planes, means for rocking said arms upon said axle, and a plurality of uprooting tines carried by each of said beams.

3. In an agricultural implement, the combination of an axle, a pair of arms pivotally carried by said axle and having recesses extending rearwardly from their rear ends, a beam seated in said recesses, removable pins extending transversely through the recessed ends of said arms and through said beam for detachably connecting the beam to the arms, and a plurality of uprooting tines carried by said beam.

4. In an agricultural implement, the combination of an axle, a pair of arms pivotally carried by said axle and having recesses extending rearwardly from their rear ends, a beam seated in said recesses, removable pins extending transversely through the recessed ends of said arms and through said beam for detachably connecting the beam to the arms, a plurality of uprooting tines carried by said beam, a lever pivotally carried by said axle structure, a rod connected to said lever and to said beam for rocking said arms upon their pivotal connection with said axle, and means for holding said lever in adjusted position.

5. In an agricultural implement, the combination of an axle, a pair of arms pivotally carried by said axle and having recesses extending rearwardly from their rear ends, a beam seated in said recesses, removable pins extending transversely through the recessed ends of said arms and through said beam for detachably connecting the beam to the arms, a plurality of uprooting tines carried by said beam, a lever pivotally carried by said axle structure, a rod connected to said lever and to said beam for rocking said arms upon their pivotal connection with said axle, means for holding said lever in adjusted position, a plurality of arms carried by said beam and extending rearwardly and upwardly therefrom, said arms provided with openings extending through their rear ends, a beam inserted through said openings, pins extending transversely through said arms and through said beam for connecting the last-named beam to the rearwardly and upwardly extending arms, and a plurality of uprooting tines carried by said last-named beam and disposed in staggered relation to the tines carried by said first named beam.

AUGUST ELLERMAN.